Figure 1:
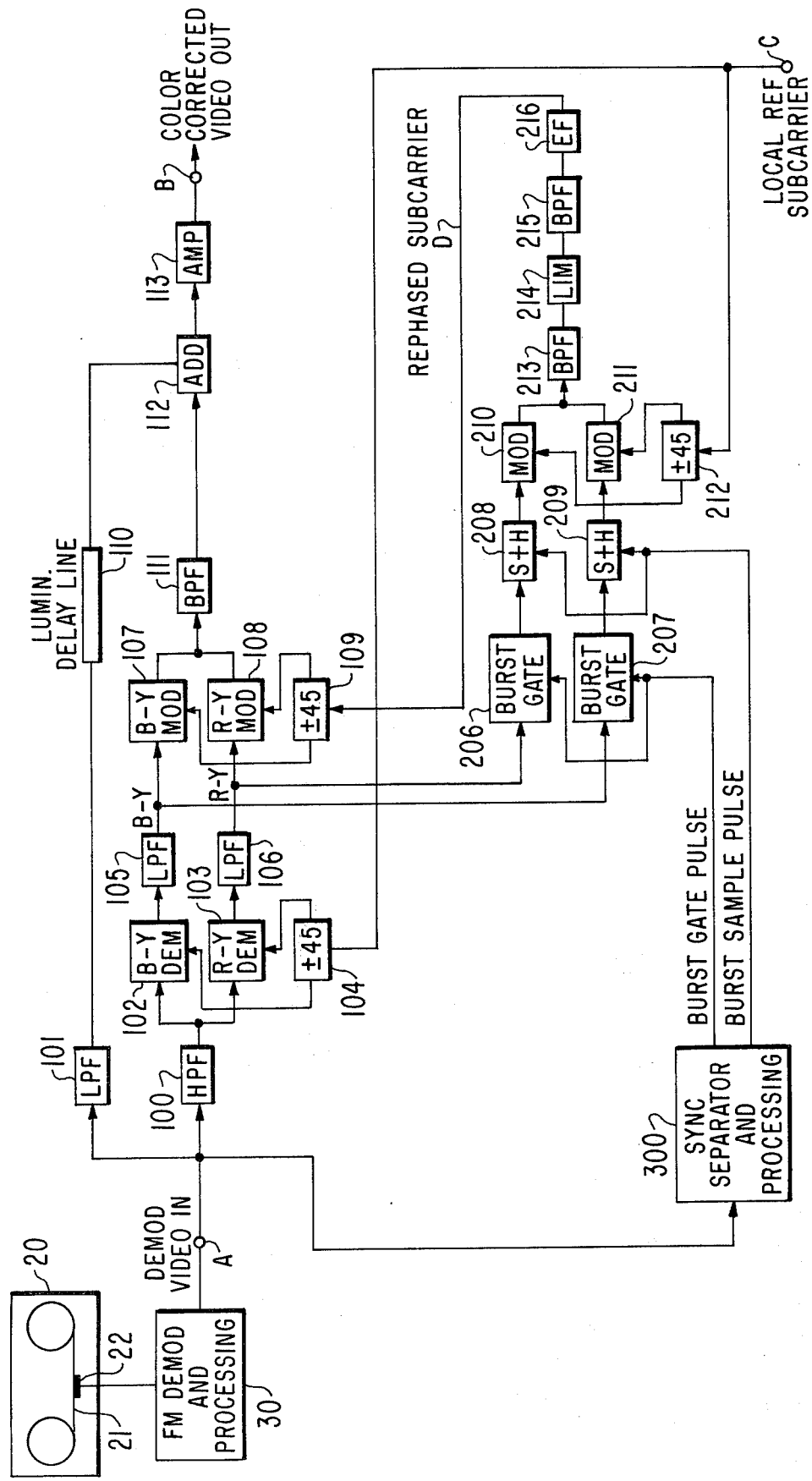

United States Patent [19]

Schiess et al.

[11] 4,001,876
[45] Jan. 4, 1977

[54] COLOR CORRECTION CIRCUIT FOR VIDEO RECORDERS

[75] Inventors: Jörg Schiess, Stallikon; Theodor Ernst Bart, Zurich, both of Switzerland

[73] Assignee: RCA Corporation, New York, N.Y.

[22] Filed: Sept. 17, 1975

[21] Appl. No.: 613,993

[52] U.S. Cl. .................................................. 358/8
[51] Int. Cl.² ...................................... H04N 5/795
[58] Field of Search ........................................ 358/8

[56] References Cited
UNITED STATES PATENTS 3,624,281  11/1971  Phan ........................................ 358/8

*Primary Examiner*—Robert L. Richardson
*Attorney, Agent, or Firm*—Eugene M. Whitacre; Mason DeCamillis

[57] ABSTRACT

A system is provided for color correction of recorded television signals. The chroma signal is decoded to baseband using a reference subcarrier which has the same timing errors as the chroma signal. The stabilized baseband signal is remodulated onto a stable subcarrier and added back to luminance. The phase modulated subcarrier used for decoding is obtained from a phase modulator fed by reference subcarrier and modulated by the recorded signal burst phase error voltage. Provisions are made for processing signals recorded in NTSC or PAL format by converting the PAL alternate line burst switching to an unswitched NTSC format.

12 Claims, 2 Drawing Figures

COLOR CORRECTION CIRCUIT FOR VIDEO RECORDERS

BACKGROUND OF THE INVENTION

The present invention relates to apparatus for signal processing systems and, more particularly, to apparatus for correcting errors introduced by the recording and reproduction of color video signals.

In the NTSC format for broadcast television signals, the chrominance information of a color video signal is carried by a pair of quadrature signal components which are phase and amplitude modulated upon a color subcarrier; e.g., 3.58 MHz, in U.S. standards. The color subcarrier is phase modulated by the color hue information and amplitude modulated by the color saturation information.

When the composite video signal is recorded on a record medium, for example, magnetic tape, the subsequent playback of the record medium introduces timing errors in the phasing of the color subcarrier. These timing errors may be attributed to flutter and wow in the magnetic recording and reproduction as well as mechanical difficulties such as non-uniform tape motion, tape stretch, and changes in tape tension.

Heretofore, a number of color correction schemes have been employed to overcome the difficulty of reproduction of color signals. Among these methods are the use of variable delay lines, prerecorded pilot tones and relatively complex servo control systems for tape speed and tension. These correction arrangements, however, are generally limited to recorder-reproducing systems having small inherent, absolute timing errors as illustrated by the professional quality studio-type recorder-reproducers. These correction circuits are both expensive and highly complex which generally prohibits their use in recorder-reproducer systems designed for consumer, educational, and industrial uses.

SUMMARY OF THE INVENTION

A composite color television signal including chroma and burst components which contain phasing errors has its chroma and burst components decoded to baseband using a first subcarrier. The baseband signals are remodulated using a second subcarrier to provide a stabilized chroma signal.

In a first embodiment, a composite color television video signal including chroma and burst components, which contain phasing errors, is coupled to separating means for separating a chroma signal including chroma and burst components from the composite video signal. Demodulating means coupled to the separating means demodulate the chroma and burst components to baseband using a stable first subcarrier to provide a baseband chroma signal containing the burst errors. Detector means coupled to the demodulators develop error signals representative of the phase errors of the burst component. The error signals are coupled to a first modulator means for rephasing the stable subcarrier to provide a second subcarrier having the same phasing errors as the original chroma and burst components. The decoded baseband signal is coupled to a second modulator which uses the second rephased subcarrier for remodulation thereby providing a stabilized chroma signal.

In a second embodiment, a composite color television video signal including chroma and burst components, which contain phasing errors, is separated. First demodulating means coupled to the separating means demodulate the chroma and burst components to baseband using a first stable subcarrier to provide a baseband chroma signal containing the burst phasing errors. Detector means coupled to the first demodulating means develop error signals representative of the phase errors of the burst component. The error signals are coupled to a first modulating means for rephasing the stable subcarrier to provide a second subcarrier having the same phasing errors as the original chroma and burst components. Second demodulating means coupled to the separating means demodulates the chroma and burst components to baseband using the rephased subcarrier to provide a baseband chroma signal free of the original phasing errors. The corrected chroma baseband signal is coupled to a second modulating means for remodulation of the chroma baseband signal with the first stable subcarrier to provide a stabilized chroma signal.

The invention is applicable to television signals recorded in both the NTSC and PAL formats. For PAL operation, a switch synchronized to the recorded signal converts the line-sequentially switched burst to an unswitched NTSC burst format.

Figure 2:
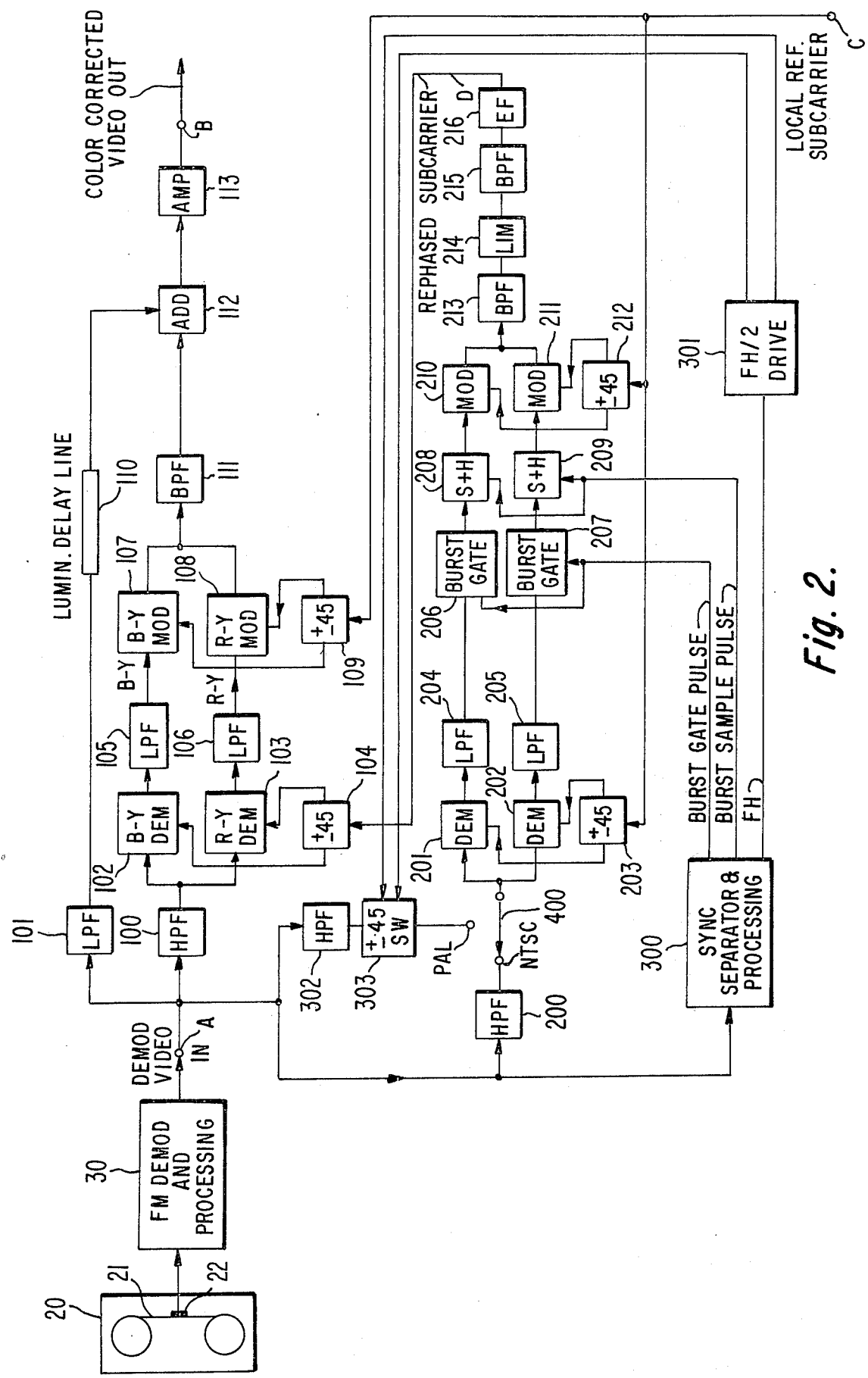

The present invention will be better understood by reference to the accompanying drawings and specification in which:

FIG. 1 is a block diagram of a signal processor embodying the present invention; and FIG. 2 is a block diagram of a second embodiment of the present invention.

DESCRIPTION OF THE INVENTION

In FIG. 1, a video tape recording apparatus 20 includes a magnetic medium or tape 21 which is processed from reel to reel by the recorder mechanism included in recording apparatus 20. A color video signal recorded on the tape 21 is reproduced by means of a playback head 22.

The playback signal from head 22 is applied to a processing stage 30 which includes a demodulator for demodulating the recorded signal from the FM carrier or other modulation used for recording.

The reproduced composite video signal demodulated from the carrier is applied to an input terminal A. The signal at terminal A is coupled to a low-pss filter 101 to derive a luminance component of the applied signal. The output signal from low-pass filter 101 is coupled to a delay line 110 for the purpose of delaying the luminance signal as will be explained below. The signal from terminal A is also coupled to a high-pass filter 100 to derive a chroma signal from the reproduced color signal. The signal at terminal A is still further coupled to a sync separator and processor 300 for the purpose of separating the synchronizing signal component and developing a related burst gate pulse and burst sampling pulse. Insofar as described, the color correcting system of FIG. 1 will provide signals representative of the luminance, chroma and synchronizing components of the demodulated composite video signal recorded on the magnetic tape 21.

The chroma signal from the output of high-pass filter 100 is coupled to demodulators 102 and 103. A local reference subcarrier signal (C) is coupled to the demodulators 102 and 103 through phase shifter 104 for the purpose of demodulating the chroma signal to its baseband components which are B–Y and R–Y. The demodulated chroma signals from demodulators 102 and 103 in the form of B–Y and R–Y components are coupled to low-pass filters 105 and 106, respectively. The output signals from low-pass filters 105 and 106 are coupled to modulators 107 and 108 for the purpose of re-encoding the R–Y and B–Y chroma components onto a second subcarrier D which is coupled to modulators 107 and 108 through phase shifter 109. The output signals of modulators 107 and 108 are combined in bandpass filter 111. The output signal of bandpass filter 111 is coupled to an input terminal of adder 112. The luminance signal previously described as being delayed by delay line 110 is coupled to another input of adder 112. The output signal of adder 112 is coupled to an amplifier 113. The output terminal of amplifier 113 is coupled to a terminal B at which a color corrected composite video signal is provided.

In operation, the chroma signal containing timing errors (jitter) applied to the input terminal of bandpass filter 100 is demodulated in demodulators 102 and 103 by a stable local subcarrier C and filtered by low-pass filters 105 and 106 to provide B–Y and R–Y chroma components which contain the timing error impressed on the original subcarrier input. The B–Y and R–Y components are remodulated by a second subcarrier D which has been rephased, as will be explained below, by the timing error of the chroma signal. The remodulation by the rephased subcarrier D produces R–Y and B–Y components free of the jitter existing on demodulation. The R–Y and B–Y modulated components are recombined and filtered in bandpass filter 111. The remodulated chroma signal is then added in adder 112 to the luminance signal which was delayed to compensate for the signal processing delay of the chroma signal to restore a complete video signal. The complete video signal consisting of luminance and corrected chroma signals is coupled to amplifier 113 where any signal loss is restored.

As was previously mentioned, the second subcarrier D utilized for remodulation of the jittering chroma signal components is a rephased subcarrier. The rephasing is accomplished as follows. The B–Y and R–Y chroma component signals from demodulators 102 and 103 which contain the burst error or jitter are lowpassed filtered in bandpass filters 105 and 106 and coupled to burst gates 206, 207. A burst gate pulse derived from sync separator and processor 300 is coupled to burst gates 206, 207 to enable the burst gates 206, 207 during burst so that only the burst error signals are provided at the output terminals of the burst gates 206, 207. The output signals from burst gates 206, 207 are coupled to signal storage circuits in the form of sample and hold circuits 208, 209, which may be constructed, for example, with FET transistors and low leakage capacitors, where they are sampled by a burst sample pulse derived from the sync separator and processor 300. The sampled value is stored throughout the length of a television line in the hold capacitors of the sample and hold circuits. The output signals of sample and hold circuits 208, 209 are coupled to modulators 210 and 211. Modulators 210, 211 have coupled to them a stable subcarrier through phase shifter 212. The outputs of the modulators 210, 211 are parallel connected and coupled to bandpass filter 213 thereby producing a subcarrier, the phase of which varies on a line to line basis in accordance with the timing errors of the burst signal on the input tape signal. This rephased subcarrier signal is coupled to a limiter 213 so that the amplitude jitter may be eliminated. The output signal of limiter 213 is coupled to a bandpass filter 215 in order to remove the harmonics produced by the limiting action of limiter 214. The limited and bandpassed output signal is coupled to a emitter follower 216 to provide a low source impedance and isolation for the rephased subcarrier.

Since the rephased subcarrier D also uses the local subcarrier C as its frequency reference, any timing errors or disturbances in subcarrier C are reflected in subcarrier D thereby minimizing the introductions of further timing errors in the demodulation and remodulation of the chroma signal components.

FIG. 2 illustrates the embodiment of FIG. 1 arranged to process signals recorded in either the NTSC or PAL configuration. The principles of operation are similar to those described in conjunction with FIG. 1; however, the circuit arrangment is altered to provide a capability of processing NTSC signal format as well as PAL signal format in which the subcarrier phase is switched on alternate television lines.

In FIG. 2, as illustrated, switch 400 is in position for processing NTSC format signals. The playback signal from head 22 is applied to a processing stage 30 which includes a demodulator for demodulating the recorded signal from the FM carrier or other modulation used for recording. The reproduced composite video signal is applied to an input terminal A. As in FIG. 1, the applied signal is split into a luminance signal by lowpass filter 100 and a chroma signal by high-pass filter 100. Also as in FIG. 1, the applied input signal is coupled to a sync separator and processor stage 300 for developing a burst gate and burst sampling pulse. The chroma output signal from bandpass filter 100 is coupled to demodulators 102 and 103. A rephased subcarrier D whose phasing varies with the input chroma signal error is coupled to demodulators 102, 103 by means of phase shifter 104 for providing at the output terminals of demodulators 102, 103, time stabilized B–Y and R–Y chroma components decoded to baseband. The output signals of demodulators 102, 103 are filtered in low-pass filters 105, 106 and coupled to modulators 107, 108. A stable reference subcarrier (C) applied to modulators 107, 108 by means of phase shifter 109 remodulates the B–Y and R–Y components. The modulated output signals from modulators 107, 108 are parallel connected and coupled to bandpass filter 111 and subsequently recombined with the delayed luminance signal in adder 112 and amplified by amplifier 113 to provide a color corrected video output signal at terminal B.

The rephased subcarrier D used for demodulating the incoming chroma component is obtained as follows. A high-pass filter 200 is coupled to the signal input terminal A for separating the chroma signal in the same manner as high-pass filter 100. The separated chroma signal is coupled to demodulators 201, 202. A stable subcarrier reference C is coupled to the demodulators 201, 202 by means of phase shifter 203 to provide at the output terminals of modulators 201, 202 a burst error signal, as was done in the circuitry of FIG. 1. The output signals of modulators 201, 202 are then filtered in low-pass filters 204, 205 and coupled to burst gates 206, 207, sample and hold circuits 208, 209, modulators 210, 211, bandpass filter 213, limiter 214, bandpass filter 215, and emitter follower 216, wherein the stable reference subcarrier is rephased in accordance with the burst error signal in the manner described in conjunction with FIG. 1. As in the apparatus of FIG. 1, since the rephased subcarrier D also uses the local subcarrier C as its frequency reference, any timing errors or disturbances in subcarrier C are reflected in subcarrier D thereby minimizing the introduction of further timing errors in the demodulation and remodulation of the chroma signal components. Insofar as described, the apparatus of FIG. 2 provides the same result as the apparatus of FIG. 1 for signals recorded in the NTSC format. Where signals recorded in the PAL format are to be processed, switch 400 is placed in the PAL position. As was previously mentioned, the burst phasing is reversed on alternate lines in the PAL format. It is necessary to compensate for this alternate line switching in order to provide a consistent rephased subcarrier for demodulating the applied signal. This is accomplished by coupling the input signal from terminal A to a high-pass filter 302. The output of high-pass filter 302 is coupled to a switch 303. An FH signal output from sync separator and processor 300 is coupled to an FH/2 multivibrator circuit 301 to provide switching signals which are coupled to switch 303. The switching signals from FH/2 circuit 301 reverses the subcarrier phase on alternate lines. The output of switch 303 is coupled to demodulators 201 and 202. Having converted the switched PAL burst to unswitched NTSC format, in all other respects the apparatus of FIG. 2 operates as previously described when switch 400 is placed in the NTSC format position.

What is claimed is:

1. A signal processing system for correcting composite color television video signals including chroma and burst components, both of which contain phasing errors, comprising:
    separating means for separating a chroma signal including chroma and burst components from said composite video signal;
    demodulating means coupled to said separating means for demodulating said chroma and burst components to baseband using a first subcarrier to provide a baseband chroma signal containing said burst phasing errors;
    detector means coupled to said demodulator means for developing error signals from said demodulated burst component;
    first modulating means coupled to said detector means for modulating said first subcarrier with said error signals to provide a second subcarrier rephased by said error signals; and
    second modulating means coupled to said demodulating means for remodulating said chroma baseband components with said second subcarrier for providing a stabilized chroma signal.

2. A signal processing system according to claim 1 wherein said detector means comprises first and second gate circuits coupled to first and second signal storage circuits for developing first and second error signals representative of the burst phasing error of said demodulated burst component.

3. A signal processing system according to claim 2 wherein said first modulating means comprises first and second modulators in which said first and second error signals are modulated by said first subcarrier in quadrature to provide first and second modulator output signals, said first and second modulator output signals are combined to provide said second subcarrier having the same timing errors of said chroma signal.

4. A signal processing system according to claim 3 wherein said first and second subcarriers are derived from a common subcarrier reference source so as to minimize the introduction of subcarrier timing errors in the remodulation of said chroma signal components.

5. A signal processing system for correcting composite color television video signals including chroma and burst components, both of which contain phasing errors, comprising:
    separating means for separating said composite video signal into a luminance signal and a chroma signal including chroma and burst components;
    demodulating means coupled to said separating means for demodulating said chroma and burst components to baseband using a first subcarrier to provide a baseband chroma signal containing said burst phasing errors;
    detector means coupled to said demodulator means for developing error signals from said demodulated burst component;
    first modulating means coupled to said detector means for modulating said first subcarrier with said error signals to provide a second subcarrier rephased by said error signals;
    second modulating means coupled to said demodulating means for remodulating said chroma baseband components with said second subcarrier; and
    means for recombining said luminance signal with said remodulated chroma signal thereby providing an output video signal in which the burst phase errors are corrected.

6. A signal processing system according to claim 5 wherein said detector means comprises first and second gate circuits coupled to first and second signal storage circuits for developing first and second error signals representative of the burst phasing error of said demodulated burst component.

7. A signal processing system according to claim 6 wherein said first modulating means comprises first and second modulators in which first and second error signals are modulated by said first subcarrier in quadrature to provide first and second modulator output signals, said first and second modulator output signals are combined to provide said second subcarrier having the same timing errors of said chroma signal.

8. A signal processing system according to claim 7 wherein said first and second subcarriers are derived from a common subcarrier reference source so as to minimize the introduction of subcarrier timing errors in the remodulation of said chroma signal components.

9. A signal processing system for correcting composite color television video signals including chroma and burst components, both of which contain phasing errors, comprising:
    separating means for separating said composite video signal into a luminance signal and a chroma signal including chroma and burst components;
    first demodulating means coupled to said separating means for demodulating said chroma and burst components to baseband using a first subcarrier to provide a baseband chroma signal containing said burst phasing errors;
    detector means coupled to said first demodulating means for developing error signals from said demodulated burst component;
    first modulating means coupled to said detector means for modulating said first subcarrier by said error signals to provide a second subcarrier rephased by said error signals;

second demodulating means coupled to said separating means for demodulating said chroma and burst components to baseband using said second subcarrier to provide a baseband chroma signal;

second modulating means coupled to said second demodulating means for remodulating said baseband chroma signal with said first subcarrier; and recombining said luminance signal with said remodulated chroma signal thereby providing an output video signal in which the burst phase errors are corrected.

10. A signal processing system according to claim 9 wherein said detector means comprises first and second gate circuits coupled to first and second signal storage circuits for developing first and second error signals representative of the burst phasing error of said demodulated burst component.

11. A signal processing system according to claim 10 wherein said first modulating means comprises first and second modulators in which said first and second error signals are modulated by said first subcarrier in quadrature to provide first and second modulator output signals, said first and second modulator output signals are combined to provide said second subcarrier having the same timing errors of said chroma signal.

12. A signal processing system according to claim 11 wherein said first and second subcarriers are derived from a common subcarrier reference source so as to minimize the introduction of subcarrier timing errors in the remodulation of said chroma signal components.

* * * * *